(12) United States Patent
Ojha et al.

(10) Patent No.: US 8,849,429 B2
(45) Date of Patent: Sep. 30, 2014

(54) SYSTEM AND METHOD FOR BLOCK INSTANTIATION

(75) Inventors: Pradyumna Ojha, Hyderabad (IN); Abhik Banerjee, Hyderabad (IN); David Evans McMillan, Moneta, VA (US); William Kennedy Galt, Rustburg, VA (US); Andre Steven DeMaurice, Salem, VA (US)

(73) Assignee: General Electric Company, Schenectady, NY (US)

( * ) Notice: Subject to any disclaimer, the term of this patent is extended or adjusted under 35 U.S.C. 154(b) by 734 days.

(21) Appl. No.: 13/103,864

(22) Filed: May 9, 2011

(65) Prior Publication Data

US 2012/0290991 A1 Nov. 15, 2012

(51) Int. Cl.
*G05B 19/42* (2006.01)
*G05B 19/042* (2006.01)
*G05B 11/01* (2006.01)

(52) U.S. Cl.
CPC .................................. *G05B 19/042* (2013.01)
USPC ................. 700/86; 700/17; 700/18; 700/83; 700/87

(58) Field of Classification Search
CPC .................................................. G05B 19/042
USPC .................... 700/17–20, 83, 86–87
See application file for complete search history.

(56) References Cited

U.S. PATENT DOCUMENTS

| | | | |
|---|---|---|---|
| 5,854,890 A * | 12/1998 | Ramachandran et al. | 726/4 |
| 5,971,581 A * | 10/1999 | Gretta et al. | 700/83 |
| 6,076,952 A * | 6/2000 | Gretta et al. | 700/83 |
| 6,141,596 A * | 10/2000 | Gretta et al. | 700/83 |
| 7,062,580 B2 * | 6/2006 | Donaires | 710/104 |
| 7,146,230 B2 | 12/2006 | Glanzer et al. | |
| 7,478,333 B2 | 1/2009 | Shah et al. | |
| 7,478,337 B2 | 1/2009 | Kodosky et al. | |
| 7,480,906 B2 | 1/2009 | Joffrain et al. | |
| 7,568,017 B2 | 7/2009 | Shah et al. | |
| 7,594,220 B2 | 9/2009 | Kodosky et al. | |
| 7,594,226 B2 | 9/2009 | Stelzer et al. | |
| 7,610,354 B2 | 10/2009 | Adams et al. | |
| 7,620,897 B2 | 11/2009 | Shah et al. | |
| 7,627,860 B2 | 12/2009 | Kodosky et al. | |
| 7,725,356 B2 | 5/2010 | Shah et al. | |
| 7,761,802 B2 | 7/2010 | Shah et al. | |
| 8,570,327 B2 * | 10/2013 | Grubbs et al. | 345/473 |
| 2004/0059851 A1 * | 3/2004 | Donaires | 710/104 |

(Continued)

FOREIGN PATENT DOCUMENTS

GB 2 394 630 A1 4/2004
WO 2005/031480 A2 4/2005

OTHER PUBLICATIONS

Search Report issued in connection with EP Application No. 12166777.8, Aug. 9, 2012.

*Primary Examiner* — Ramesh Patel
(74) *Attorney, Agent, or Firm* — Fletcher Yoder, P.C.

(57) ABSTRACT

Systems and methods for block instantiation are provided. In one embodiment, a system includes a processor and a visual instantiation facility executable by the processor. The visual instantiation facility is configured to read a device definition (DD) file including at least one function block and to visually display function block instantiation information of the at least one function block in a visual display. The visual instantiation facility is further configured to instantiate the at least one function block in a field device.

21 Claims, 6 Drawing Sheets

(56) References Cited

U.S. PATENT DOCUMENTS

| | | |
|---|---|---|
| 2007/0244583 A1 | 10/2007 | Rachut |
| 2008/0141170 A1 | 6/2008 | Kodosky et al. |
| 2008/0141174 A1 | 6/2008 | Kodosky et al. |
| 2009/0132940 A1 | 5/2009 | Joffrain et al. |
| 2009/0259972 A1 | 10/2009 | Kodosky et al. |
| 2009/0287914 A1 | 11/2009 | Shah et al. |
| 2010/0005425 A1 | 1/2010 | Kodosky et al. |
| 2010/0011311 A1 | 1/2010 | Kodosky et al. |
| 2010/0058188 A1 | 3/2010 | Shah et al. |
| 2010/0123722 A1* | 5/2010 | Grubbs et al. ............... 345/473 |
| 2011/0271266 A1* | 11/2011 | Kreft et al. ................... 717/168 |

* cited by examiner

SYSTEM AND METHOD FOR BLOCK INSTANTIATION

BACKGROUND OF THE INVENTION

The subject matter disclosed herein relates to instantiation of systems, and more specifically, to instantiation of function blocks.

Certain systems, such as an industrial control system, may provide for control capabilities that enable the execution of control instructions in various types of devices, such as sensors, pumps, valves, and the like. For example, function blocks may be used to encapsulate control logic in the various devices. However, the function blocks may be created by different manufacturers. Accordingly, configuring and/or programming the multiple devices may be complex and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a processor and a visual instantiation facility executable by the processor. The visual instantiation facility is configured to read a device definition (DD) file including at least one function block and to visually display function block instantiation information of the at least one function block in a visual display. The visual instantiation facility is further configured to instantiate the at least one function block in a field device.

In a second embodiment, a method includes reading, via a processor of a computer, configuration information from a device description (DD) file of a field device and reading, via the processor of the computer, a function block from the DD file of the field device. The method also includes displaying, on a display of the computer, a visual representation of the function block and determining, via the processor of the computer, support for function block instantiation in the field device based on the configuration information. The method further includes displaying, on the display of the computer, a visual representation of support for function block instantiation, and enabling, via the processor of the computer, a visual instantiation facility configured for a user to instantiate the function block in the field device if the field device supports function block instantiation.

In a third embodiment, a non-transitory tangible computer-readable medium includes executable code. The code includes instructions for reading a device description (DD) file, and determining support for function block instantiation in a field device based on the DD file. The code further includes displaying a visual representation of the support for function block instantiation in the field device, and providing a visual instantiation facility for a user to instantiate the function block in the field device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial automation systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark™ VIe controller system, available from General Electric Co., of Schenectady, N.Y., multiple devices may be communicatively coupled to and controlled by a controller. Indeed, multiple controllers may be controlling multiple field devices, as described in more detail with respect to FIG. 1 below. The devices communicatively connected to the controller may include field devices, such as Fieldbus Foundation™ field devices, that include support for the Foundation H1 bi-directional communications protocol. Accordingly, the field devices may be "smart" devices that can perform computing tasks such as the execution of computer instructions or control logic.

The computer instructions or control logic may be encapsulated in function blocks. For example, a proportional-integral-derivative (PID) function block may include PID instructions suitable for implementing a closed-loop control of certain processes, such as industrial processes. Indeed, various types of function blocks may be provided that can include a variety of computer instructions or control logic, as described in more detail below with respect to FIG. 1. Each function block may then be instantiated or loaded into memory of the field device for use in a control loop. The field device may then execute the computer instructions or control logic in the instantiated function block. The function block instantiation may use a portion of the field device's memory and other resources (e.g., processor resources). Accordingly, a user, such as a control engineer or commissioning engineer, may refer to the manufacturer-provided information and calculate how many functions blocks may be instantiated in a particular device. However, the field devices and function blocks may be provided by a variety of manufacturers. Manually computing block instantiation information may be error-prone, time consuming and costly.

The systems and methods disclosed herein enable automatic derivation of block instantiation information. Instantiation information for a variety of field devices may be easily provided and displayed for review by the user. Additionally, the systems and methods disclosed herein enable the user to receive feedback on instantiation limits, such as how many blocks may be instantiated in a particular device, and the number instantiations of a specific block's type (e.g., PID block), as well as the total number of blocks of all types that may be instantiated. Further, the instantiation information may be provided prior to actual device instantiation. That is, the system and methods disclosed herein may enable the user to visualize the information prior to actual instantiation to aid in preparing a desired device configuration, and may store the desired device configuration prior to the actual connection of the field devices to an industrial process control system, such as the industrial process control system described in more detail below with respect to FIG. 1. Once the field devices are connected to the industrial process control system, then the stored device configuration may be used to execute the block instantiation in the field devices. Likewise, re-configuring the field devices may be performed more efficiently. In this way, the field devices, the controller, and the industrial process control system may be more capably managed.

Figure 1:
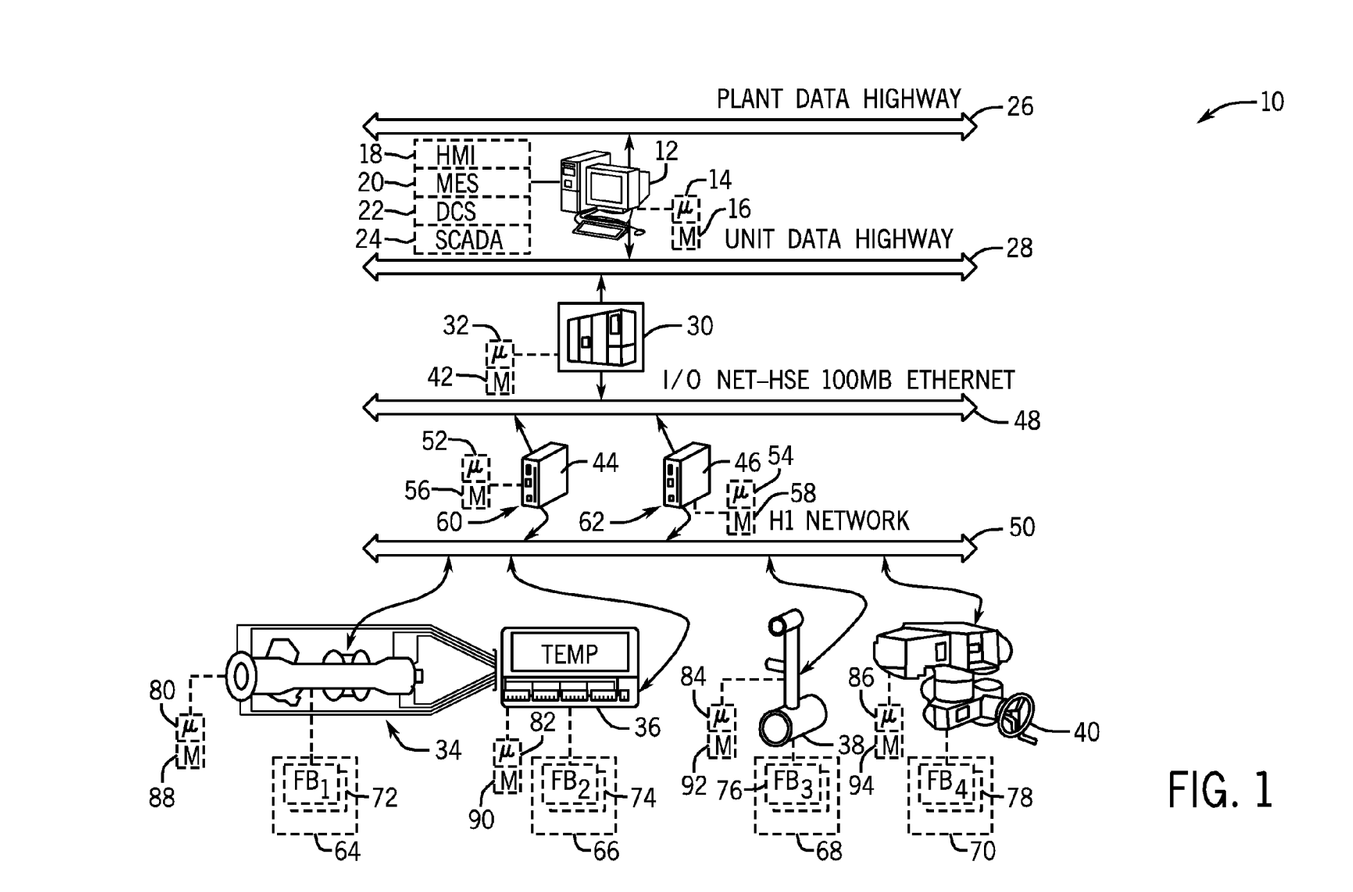
FIG. 1 is a schematic diagram of an embodiment of an industrial control system, including a communications bus.

Turning to FIG. 1, an embodiment of an industrial process control system 10 is depicted. The control system 10 may include a computer system 12 suitable for executing a variety of field device configuration and monitoring applications, and for providing an operator interface through which an engineer or technician may monitor the components of the control system 10. Accordingly, the computer 12 includes a processor 14 that may be used in processing computer instructions, and a memory 16 that may be used to store computer instructions and other data. The computer system 12 may include any type of computing device suitable for running software applications, such as a laptop, a workstation, a tablet computer, or a handheld portable device (e.g., personal digital assistant or cell phone). Indeed, the computer system 12 may include any of a variety of hardware and/or operating system platforms. In accordance with one embodiment, the computer 12 may host an industrial control software, such as a human-machine interface (HMI) software 18, a manufacturing execution system (MES) 20, a distributed control system (DCS) 22, and/or a supervisor control and data acquisition (SCADA) system 24. The HMI 18, MES 20, DCS 22, and/or SCADA 24 may be stored as executable code instructions stored on non-transitory tangible computer readable media, such as the memory 16 of the computer 12. For example, the computer 12 may host the ControlST™ software, available from General Electric Co., of Schenectady, N.Y.

Further, the computer system 12 is communicatively connected to a plant data highway 26 suitable for enabling communication between the depicted computer 12 and other computers 12 in the plant. Indeed, the industrial control system 10 may include multiple computer systems 12 interconnected through the plant data highway 26. The computer system 12 may be further communicatively connected to a unit data highway 28, suitable for communicatively coupling the computer system 12 to an industrial controller 30. The industrial controller 30 may include a processor 32 suitable for executing computer instructions or control logic useful in automating a variety of plant equipment, such as a turbine system 34, a temperature sensor 36, a valve 38, and a pump 40. The industrial controller 30 may further include a memory 42 for use in storing, for example, computer instructions and other data. The industrial controller 30 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 26 may be a Mark™ VIe controller system, available from General Electric Co., of Schenectady, N.Y.

In the depicted embodiment, the turbine system 34, the temperature sensor 36, the valve 38, and the pump 40 are communicatively connected to the industrial controller 30 by using linking devices 44 and 46 suitable for interfacing between an I/O network 48 and an H1 network 50. For example, the linking devices 44 and 46 may include the FG-100 linking device, available from Softing AG, of Haar, Germany. As depicted, the linking devices 44 and 46 may include processors 52 and 54, respectively, useful in executing computer instructions, and may also include memory 56 and 58, useful in storing computer instructions and other data. In some embodiments, the I/O network 48 may be a 100 Megabit (MB) high speed Ethernet (HSE) network, and the H1 network 50 may be a 31.25 kilobit/second network. Accordingly, data transmitted and received through the I/O network 48 may in turn be transmitted and received by the H1 network 50. That is, the linking devices 44 and 46 may act as bridges between the I/O network 48 and the H1 network 50. For example, higher speed data on the I/O network 48 may be buffered, and then transmitted at suitable speed on the H1 network 50. Accordingly, a variety of field devices may be linked to the industrial controller 30 and to the computer 12. For example, the field devices 34, 36, 38, and 40 may include or may be industrial devices, such as Fieldbus Foundation™ devices that include support for the Foundation H1 bi-directional communications protocol. The field devices 34, 36, 38, and 40 may also include support for other communication protocols, such as those found in the HART® Communications Foundation (HCF) protocol, and the Profibus Nutzer Organization e.V. (PNO) protocol.

Each of the linking devices 44 and 46 may include one or more segment ports 60 and 62 useful in segmenting the H1 network 42. For example, the linking device 44 may use the segment port 60 to communicatively couple with the devices 34 and 36, while the linking device 46 may use the segment port 62 to communicatively couple with the devices 38 and 40. Distributing the input/output between the field devices 34, 36, 38, and 40, by using, for example, the segment ports 60 and 62, may enable a physical separation useful in maintaining fault tolerance, redundancy, and improving communications time.

Each field device 34, 36, 38, and 40 may include a respective device description (DD) file, such as the depicted DD files 64, 66, 68, and 70. The DD files 64, 66, 68, and 70 may be written in a device description language (DDL), such as the DDL defined in the International Electrotechnical Commission (IEC) 61804 standard. In some embodiments, the files 64, 66, 68, and 70 are tokenized binary files. That is, the DD files 64, 66, 68, and 70 may include data formatted in a tokenized binary format useful in reducing the size of the DD files 64, 66, 68, and 70. The DD files 64, 66, 68, and 70 may each include one or more function blocks 72, 74, 76, and 78. The function blocks 72, 74, 76, and 78 may include computer instructions or computer logic executable by processors 80, 82, 84, and 86. Indeed, the function blocks 72, 74, 76, and 78 may be instantiated into memory 88, 90, 92, 94, and then executed by the processors 80, 82, 84, and 86, respectively. In this way, the field devices 34, 36, 38, and 40 may contribute control logic and other computer instructions towards the execution of processes in the industrial process control system 10. Advantageously, the systems and methods disclosed herein provide the user (e.g., control engineer or commissioning engineer) with facilities suitable for presenting instantiation information and enabling a more efficient configuration of the field devices 34, 36, 38, and 40, such through a screen view described in more detail below with respect to FIG. 2.

Figure 2:
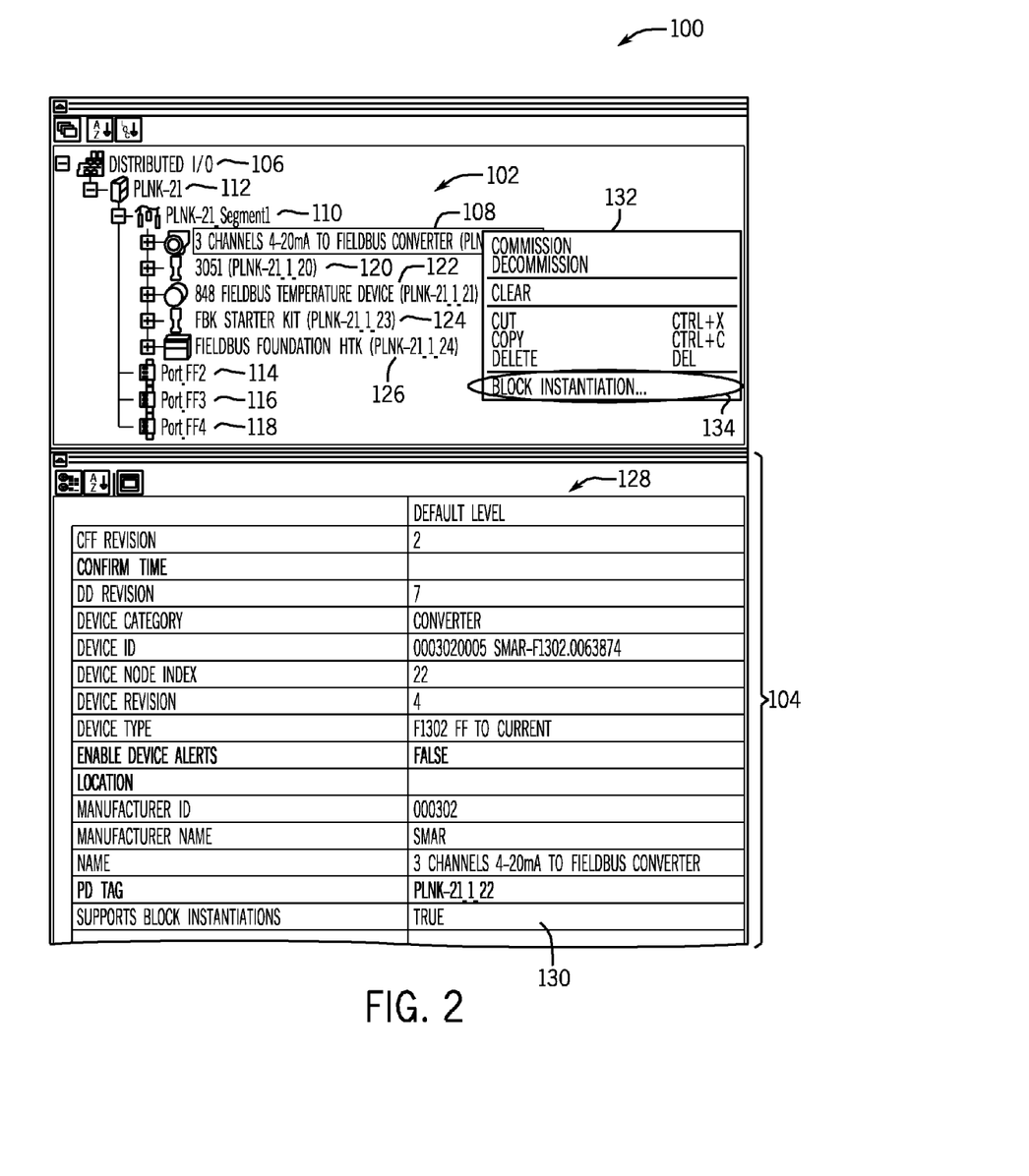
FIG. 2 is a screen view of an embodiment of a treeview control and a property sheet displaying options for a component of the industrial control system of FIG. 1.

FIG. 2 is a screen view 100 of an embodiment of a treeview control 102 and a property sheet 104 displaying distributed I/O 106 options for a component of the industrial process control system 10, such as for the controller 30 shown in FIG. 1. For example, the user (e.g., controls engineer, commissioning engineer) may use one of the HMI 18, MES 20, DCS 22, and/or SCADA 24 shown in FIG. 1 to select the controller 30 for commissioning of the linking devices 44 and 46 and/or the field devices 34, 36, 38, and 40. The HMI 18, MES 20, DCS 22, and/or SCADA 24 may display the screen view 100 to enable user interaction with the treeview control 102 and property sheet 104. In some embodiments, the screen view 100 depicted in FIG. 2 may be implemented as executable code instructions stored on non-transitory, tangible, machine-readable media, such as the computer memory 16 shown in FIG. 1.

The selection of the controller 30 may result in the presentation of the screen view 100, which includes the treeview control 102 and the property sheet 104 having various properties associated with a selected item, such as a selected field device node 108. As depicted, the selected field device node 108 is connected to a segment node 110 labeled "PLNK-21_Segment1," which in turn is associated with a linking device node 112 labeled "PLNK-21." The linking device node 112 may represent any linking device connected to the controller 30, such as the linking devices 44 or 46 shown in FIG. 1. Accordingly, the segment node 112 may represent any one of the segments attached to the linking devices 44 or 46. As also shown in FIG. 2, ports 114, 116, and 118 remain unattached to any segments nodes (i.e., these ports of the linking device corresponding to linking device node 112 are depicted as currently not communicatively coupled to a segment of the H1 network 50). Also depicted are several unselected field device nodes 120, 122, 124, and 126, which may correspond to any other field devices that may be connected to the linking device represented by the linking device node 112.

The property sheet 104 includes a variety of slots 128 useful in displaying information related to the selected item, such as the selected field device node 108. Advantageously, a slot 130 depicts information related to instantiation support. In one embodiment, the slot 130 may display a Boolean value for the property "Supports Block Instantiation." More specifically, if the field device corresponding to the selected field device node 108 supports block instantiation, then the slot 130 may display a text such as "True." Conversely, if the field device corresponding to the selected field device node 108 does not support block instantiation, then the slot 130 may display a text such as "False." In this way, the user may select a field device node 108, 120, 122, 124, or 126 and quickly determine if the field device corresponding to the field device node 108, 120, 122, 124, or 126 includes support for block instantiation. It is to be noted that the field device nodes 108, 120, 122, 124, and/or 126 may be added to the segment node 110 without the corresponding field device having to be physically connected to the industrial process control system 10 shown in FIG. 1. Indeed, the user may first add the field device nodes 108, 120, 122, 124, and/or 126 and then select one of the field device nodes 108, 120, 122, 124, or 126 to quickly verify if, when connected, the corresponding physical field device supports function block instantiation.

If a selected field node, such as the field node 108, includes support for block instantiation, then the user may activate a menu, such as the context menu 132. The context menu 132 may include a "Block Instantiation . . . " menu item 134 if the selected field device node 108 includes support for block instantiation. If the selected field device node 108 does not include support for block instantiation, then the menu item 134 may not appear in the context menu 132, or may be otherwise disabled (e.g., grayed out) from the context menu 132. By enabling and disabling the menu item 134 based on support for block instantiation, the treeview control 102 may prevent instantiation errors and improve user effectiveness. Activating the menu item 134 may then launch a function block instantiation dialog box, as described in FIG. 3.

Figure 3:
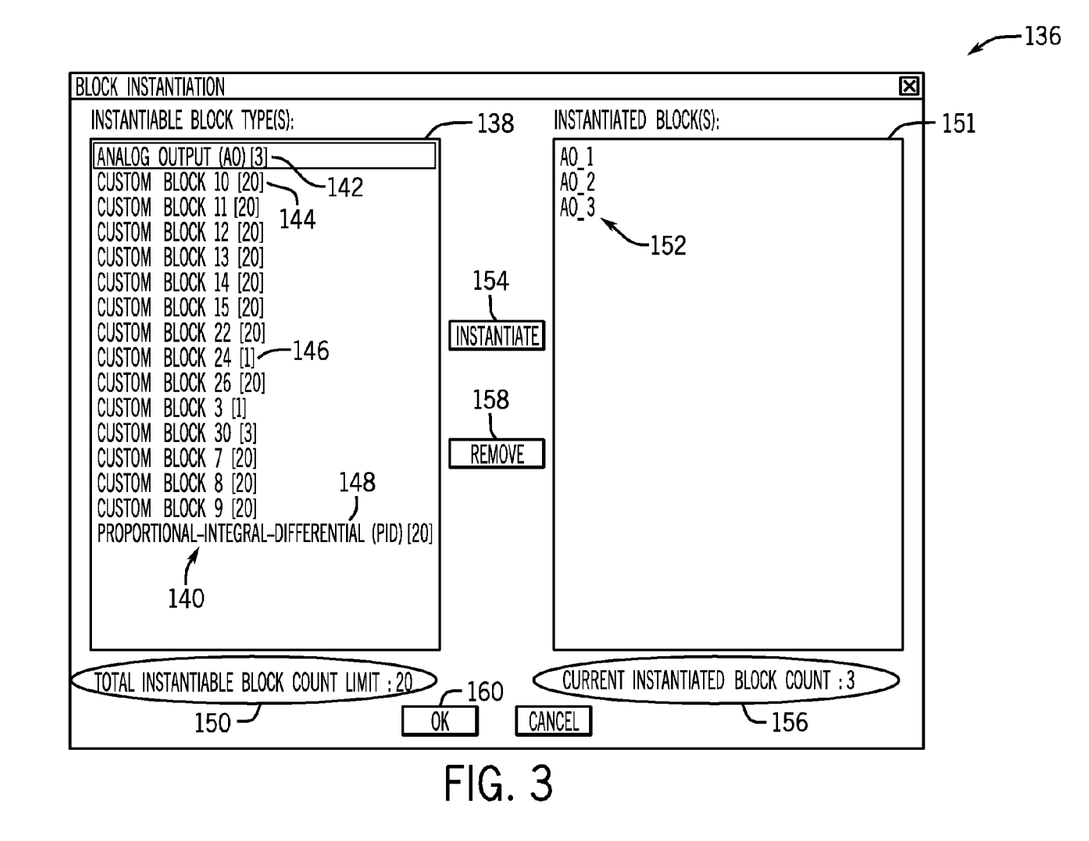
FIG. 3 is a screen view of an embodiment of a function block instantiation dialog box launched from the screen view of FIG. 2.

FIG. 3 depicts an embodiment of a function block instantiation dialog box 136 that may have been launched by using the menu item 134 shown in FIG. 2. In some embodiments, the dialog box 136 depicted in FIG. 3 may be implemented as executable code instructions stored on non-transitory, tangible, machine-readable media, such as the computer memory 16 shown in FIG. 1. The function block instantiation dialog box 136 may provide further block instantiation information related to a field device corresponding to the selected field device node 108 shown in FIG. 2. For example, a left list box 138 may include a list 140 of all function block types that may be instantiated by a field device (e.g., devices 34, 36, 38, or 40) depicted in FIG. 1). That is, the list box 138 may display only instantiable function blocks, as opposed to standard function blocks. Instantiable function blocks may be loaded as desired into field device memory, while standard function blocks may already be pre-loaded. By loading the instantiable function blocks into memory only when desired (i.e., on demand), the dialog box 136 enables added configuration flexibility. As mentioned above, the field devices may include Fieldbus Foundation devices, HART devices, and/or Profibus function blocks. Accordingly, the non-inclusive list 140 of function block types may include resource blocks, display blocks, analog input blocks, analog output blocks, discrete input blocks, discrete output blocks, diagnostic blocks, multiple analog input blocks, multiple analog output blocks, PID control blocks, enhanced PID control blocks, advanced PID control blocks, arithmetic blocks, splitter blocks, signal characterizer blocks, integrator blocks, analog alarm blocks, input selector blocks, setpoint ramp generator blocks, timer and logic blocks, lead lag blocks, output signal selector and dynamic limiter blocks, density blocks, constant blocks, custom blocks, and/or flip-flop and edge trigger blocks.

In one embodiment, the block instantiation dialog box 136 may read or parse a DD file, such as the DD file 64, 66, 68, or 70 shown in FIG. 1, and use configuration information in the DD file to derive the instantiable function block types presented in the list box 138. In this way, the user may quickly view all of the function block types that are instantiable in a desired field device (e.g., field devices 34, 36, 38, and/or 40). Each of the displayed function block types presented in the list box 138 may include a number enclosed in brackets. For example, an Analog Output (AO) block type 142 includes the number 3 enclosed in brackets (i.e., "[3]"). The bracketed number indicates the number of blocks for that particular block type (e.g., AO block type 142) that may be instantiated by the corresponding physical field device. For example, the field device corresponding to the selected field device node 108 (shown in FIG. 2) may enable 3 instantiations of the AO block type 142. Likewise, the same field device may enable 20 instantiations of a Custom 10 block type 144, 1 instantiation of a Custom 24 block type 146, 20 instantiations of a Proportional-Integral-Derivative (PID) block type 148, and so on. By displaying a bracketed number alongside the block type, the list box 138 enables an efficient presentation of the number of block instantiations that may be supported for a given type of function block.

A total number of function block instantiations may also be displayed, for example, in a text label 150. More specifically, the number displayed in the text label 150 is derived from the total number of block instantiations, regardless of block type, that may be supported by the field device. That is, the field device corresponding to the selected field device node 108 (shown in FIG. 2) may support a certain total limit on all function block instantiations, due to, for example, memory size. As depicted in FIG. 3, the text label 150 displays a total block count limit of 20 instantiable function blocks. It is to be understood that the number of instantiable function blocks may be any number supported by the field device. As mentioned above, the total instantiable block count limit may be derived from the DD file associated with the field device.

Additionally, the block instantiation dialog box 136 may include a right list box 151 used to display function blocks to be instantiated. For example, the depicted list box 150 illustrates 3 AO function blocks 152 (e.g, AO_1, AO_2, and AO_3) to be instantiated. To instantiate a function block, an Instantiate button 154 is provided. Accordingly, the user may first select a function block type to instantiate from the list box 138 and then activate the Instantiate button 154. The dialog box 136 may then place a new item in the right list box 151 for instantiation, corresponding to the function block type selected from the left list box 138. In this manner, the dialog box 136 provides for a visual instantiation facility suitable for presenting the list of instantiable function blocks 140 and enabling the user to instantiate any instantiable function blocks found in the displayed list 140. The term "facility," has used herein, may refer to a software tool or computer-implemented algorithm including executable computer instructions. Additionally, the dialog box 136 may update a text label 156 displaying the currently instantiated block count. As additional function blocks are instantiated, the text label 156 may display the current instantiation block count total, including the additional function block instantiations. In this way, user feedback of block instantiation is provided so as to enable an efficient commissioning of field devices.

A Remove button 158 may also be provided for removing or otherwise uninstantiating function blocks. For example, one or more items from the list box 151 may be first selected for removal, and the Remove button 158 may be subsequently activated. Activating the Remove button 158 may thus result in the removal of the selected item from the list box 151, and the uninstantiation of the item if the item had previously been instantiated (e.g., loaded into memory of a field device). In this way, the dialog box 136 provides for a visual uninstantiation facility suitable for presenting the list of function blocks 152 and enabling the user to uninstantiate any function blocks in the displayed list 152. Further, several facilities may be provided that may be useful in preventing the user from crossing limits associated with maximum allowable instantiation blocks in a field device, as described in more detail below with respect to FIG. 4. Additionally, an OK button 160 may be provided for closing the dialog box 136.

Figure 4:
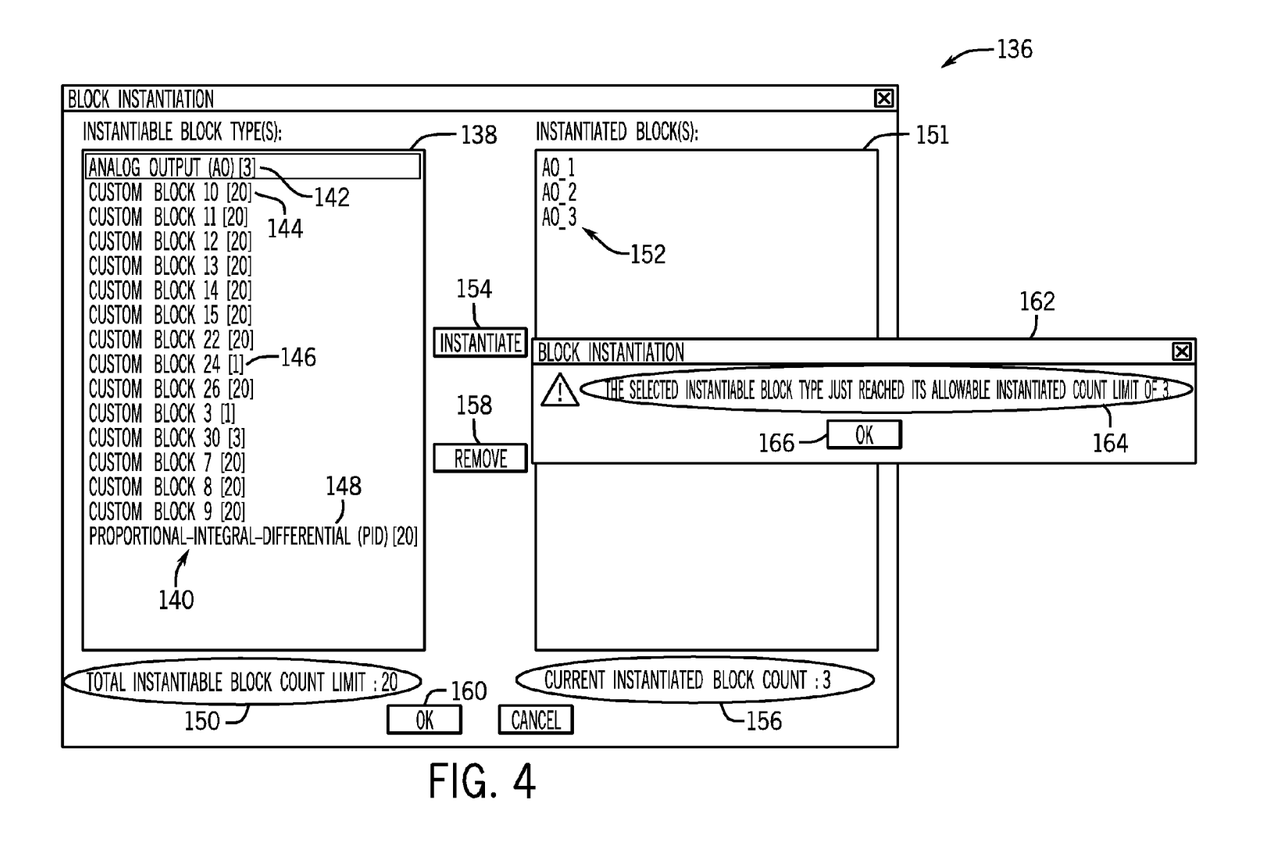
FIG. 4 is a screen view of an embodiment of the function block instantiation dialog box of FIG. 3, including a warning message box.

FIG. 4 illustrates an embodiment of the dialog box 136 depicted in FIG. 3, including a warning message box 162. Because the figure contains like elements found in FIG. 3, these elements are denoted using like reference numbers. In some embodiments, the dialog box 136 depicted in FIG. 4 may be implemented as executable code instructions stored on non-transitory, tangible, machine-readable media, such as the computer memory 16 shown in FIG. 1. The warning message box 162 may be launched when an instantiation limit is reached, such as a limit on the number of function block types that may be instantiated and/or the limit on the total number of function blocks that may be instantiated. In the depicted example, the limit on the AO function block type 142 has been reached. Accordingly, a text label 164 may be used to display a warning message, such as "The selected instantiable block type just reached its allowable instantiated count limit of 3." If the limit on the total number of function blocks that may be instantiated be reached, then a different message may be displayed, such as "The total instantiable block count just reached its allowable instantiated total count of 20."

Additionally or alternatively, the Instantiate button 154 may be made inactive, for example, by graying out the button 154, if the limit is reached for the number of function block types that may be instantiated and/or the limit is reached for the total number of function blocks that may be instantiated. An OK button 166 may then be activated to dismiss the warning message box 162. By providing for facilities to prevent the over-instantiation of function blocks, the dialog box 136 may enable a more efficient utilization of field device resources and may prevent instantiation errors. Once a desired list of function blocks 152 has been disposed on the list box 151, the OK button 160 may be activated. Activating the OK button 160 may then associate and/or instantiate the function blocks 152 in the corresponding field device. For example, the computer instructions or control logic included in the function blocks 152 may be moved into memory of the field device in response to the activation of the OK button 160. Additionally or alternatively, the instantiation may occur by using other methods, such as context menus (e.g., context menu 132 of FIG. 2). For example, the context menu may include a "commission" menu item for use in the instantiation.

Figure 5:
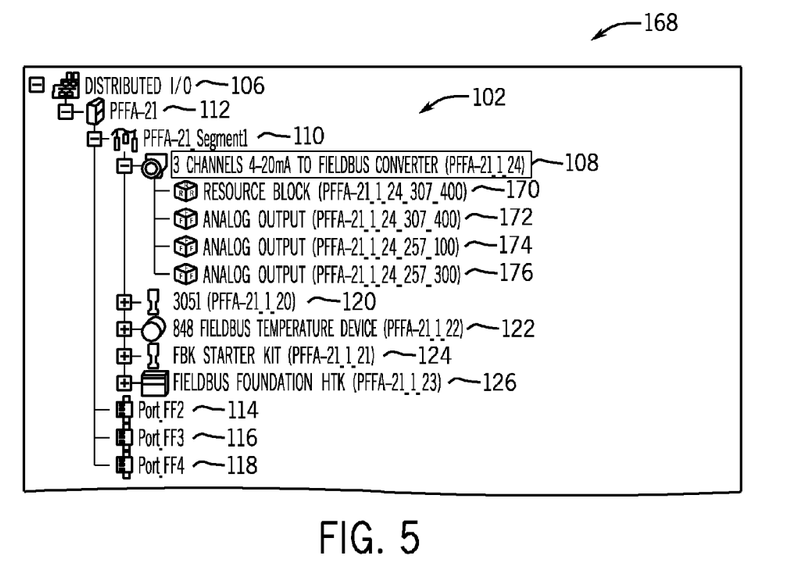
FIG. 5 is a screen view of an embodiment of the treeview control depicted in FIG. 2.

FIG. 5 is a screen view 168 illustrating an embodiment of the treeview control 102 depicted in FIG. 2. In some embodiments, the screen view 168 depicted in FIG. 5 may be implemented as executable code instructions stored on non-transitory, tangible, machine-readable media, such as the computer memory 16 shown in FIG. 1. Because the figure contains like elements found in FIG. 2, these elements are denoted using like reference numbers. In the depicted embodiment, the treeview control 120 includes multiple function blocks 170, 172, 174, and 176 that may have been associated with the selected field device node 108 by using, for example, the dialog box 136 depicted in FIGS. 3 and 4. As mentioned above, the field device corresponding to the selected field device node 108 need not be connected into the industrial control system 10. Indeed, the user may pre-configure the function blocks 170, 172, 174, and 176 without having to connect any field devices to the industrial process control system 10. Once a field device is set up for an industrial control system 10, then the function blocks 170, 172, 174, 176 and 176 may be instantiated in the attached field device, if the attached field device supports block instantiation. In one embodiment, a build or compile process may be used to collect information about the instantiated function blocks 170, 172, 174, and 176 and make it ready to be loaded into the field device memory. For example, the computer instructions or control logic included in the function blocks 170, 172, 174, and 176 may be loaded into the memory of the field device, such as the memory 88, 90, 92, or 94 of the respective field devices 34, 36, 38, or 40 depicted in FIG. 1. The field device may then execute the computer instructions or control logic instantiated therein.

Advantageously, the configuration information, including instantiation information displayed in the treeview control 102, may be stored in a database. Accordingly, the field device associated with the field device node 108 may be easily replaced with an equivalent field device, for example, in case of damage to the original field device. Then the new field device may be added to the appropriate linking device and then the build process may be re-executed, thus loading the computer instructions or control logic included in the function blocks 170, 172, 174, and 176 into the new field device's memory. By providing for a facility to easily replace field devices, the systems and methods disclosed herein may enable optimal management of the industrial control system 10.

FIG. 5 also illustrates the use of colored icons to enable a more efficient display of information. For example, the resource blocks, such as the Resource block 170 may be displayed in a color such as green. Function blocks, such as the blocks 172, 174, and 176, may be displayed in a color such as red. Transducer-related blocks may be displayed in a color such as blue. Likewise, mathematical blocks, such as Arithmetic blocks and the Constant blocks, may be displayed in a color such as yellow. It is to be understood that other colors or icons may be used for the display of the function blocks 170, 172, 174, and 176. Indeed, a variety of colors may be used to display any function block that may be presented in the treeview control 102. Likewise, different icons may be used to visualize different types of function blocks. In this way, the treeview control 102 may provide for quick visualization of function block information using colors and/or icons.

Figure 6:
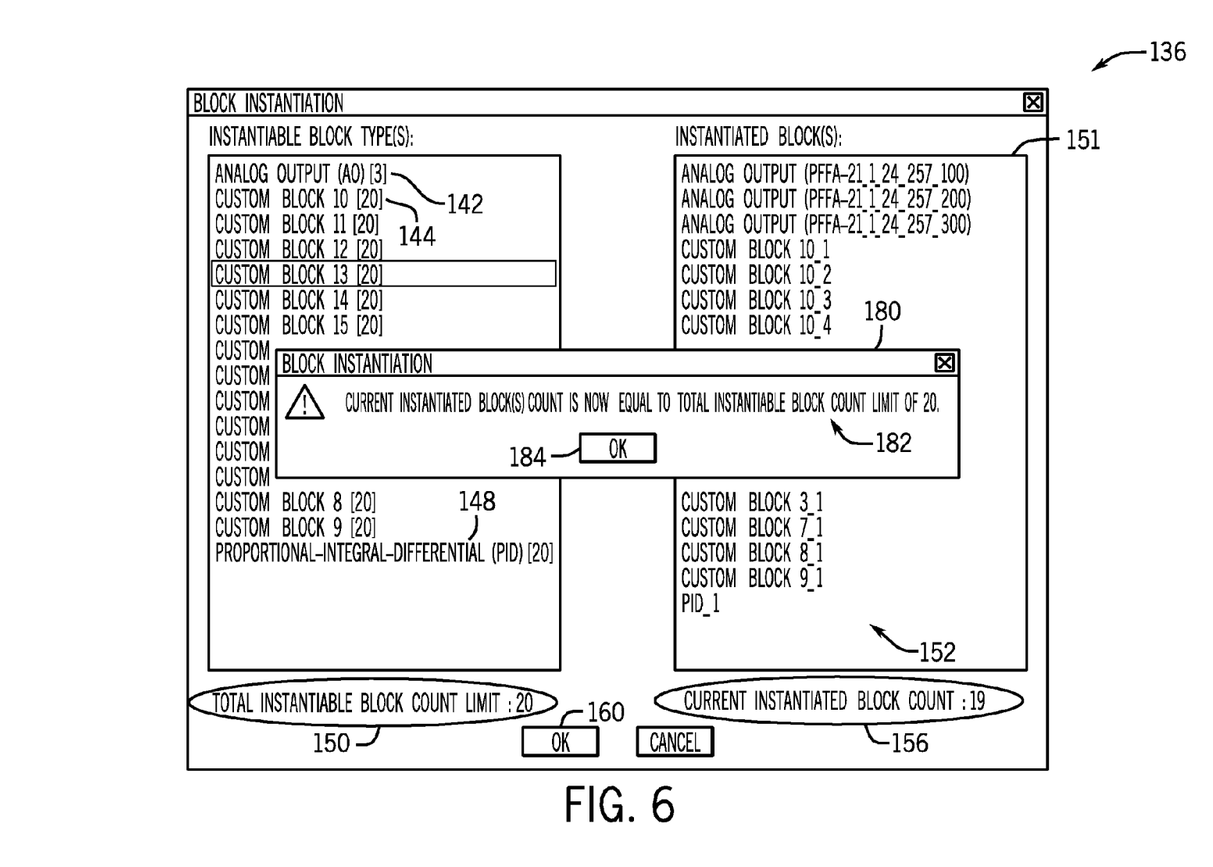
FIG. 6 is a screen view of an embodiment of the function block instantiation dialog box of FIG. 3, including a warning message box.

FIG. 6 is a screen view of an embodiment of the function block instantiation dialog box 136 of FIG. 3, including a warning message box 180. Because the figure contains like elements found in FIG. 3, these elements are denoted using like reference numbers. In some embodiments, the dialog box 136 depicted in FIG. 6 may be implemented as executable code instructions stored on non-transitory, tangible, machine-readable media, such as the computer memory 16 shown in FIG. 1. The warning message box 180 may be launched when an instantiation limit is reached, such as a limit on the total number of function blocks that may be instantiated. In the depicted example, the total instantiable block count limit of 20 blocks has been reached. Accordingly, a text label 182 may be used to display a warning message, such as "Current instantiated block(s) count is now equal to total instantiable block count limit of 20." An OK button 184 may then be activated to dismiss the warning message box 180. By providing for facilities to prevent the over-instantiation of function blocks, the dialog box 136 may enable a more efficient utilization of field device resources and may prevent instantiation errors. Once a desired list of function blocks 152 has been disposed on the list box 151, the OK button 160 may be activated.

Technical effects of the invention include enabling the reading of a device definition (DD) file including instantiable function blocks. A visual instantiation facility is provided that may use DD file information to derive a list of instantiable function blocks, as well as instantiation information related to the instantiable function blocks. The instantiation information may include a limit on the total number of blocks of any type that may be instantiated and a limit on the number of blocks of a certain type (e.g., AO, AI, PID, Constant) that may be instantiated. The visual instantiation facility may then provide for a user to instantiate function blocks and also provide feedback on instantiation activities. The feedback may include, for example, a list of currently instantiated blocks as well as a current instantiated block count. Warning messages may also be provided, informing the user of certain instantiation limits. Additionally, the visual instantiation facility may be disabled, for example, by deactivating certain features (e.g., buttons) when instantiation limits are reached. Further, a visual uninstantiation facility is also provided for selecting instantiated function blocks and then uninstantiating the function blocks from a field device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial process control system comprising:
a processor;
a visual instantiation facility executable by the processor and configured to read a device definition (DD) file comprising at least one function block and to visually display function block instantiation information of the at least one function block in a visual display, wherein the function block instantiation information comprises a first count of total instantiable function blocks supported by a field device and wherein the visual instantiation facility is configured to instantiate the at least one function block in the field device.

2. The system of claim 1, wherein the DD file comprises instructions written in an International Electrotechnical Commission (IEC) 61804 language standard.

3. The system of claim 1, wherein the at least one function block comprise a Fieldbus Foundation function block, a HART function block, a Profibus function block, or a combination thereof.

4. The system of claim 1, wherein the field device comprises a Fieldbus Foundation field device, a HART field device, a Profibus field device, or a combination thereof.

5. The system of claim 1, comprising the field device, a linking device, a high speed Ethernet network, and a Foundation H1 network, wherein the processor is coupled to the high speed Ethernet network, the linking device is configured to link the high speed Ethernet network to the Foundation H1 network, and the field device is attached to the Foundation H1 network.

6. The system of claim 1, wherein the DD file comprises a tokenized DD file.

7. The system of claim 1, comprising the controller having the processor.

8. The system of claim 1, comprising a workstation, a laptop, a tablet, or a cellphone having the processor.

9. The system of claim 1, comprising the field device, a linking device, a high speed Ethernet network, and a Foundation H1 network, wherein the linking device is configured to link the high speed Ethernet network to the Foundation H1 network, and the field device is attached to the Foundation H1 network.

10. The system of claim 1, wherein the visual display comprises a dialog box, a screen view, or a combination thereof, displaying the at least one function block.

11. The system of claim 1, wherein the function block instantiation information comprises a second count of function blocks currently instantiated in the field device.

12. A method comprising:
reading, via a processor of a computer, configuration information from a device description (DD) file associated with a field device;
reading, via the processor of the computer, a function block from the DD file of the field device;
displaying, on a display of the computer, a visual representation of the function block;
determining, via the processor of the computer, support for function block instantiation in the field device based on the configuration information;
displaying, on the display of the computer, a visual representation of support for function block instantiation wherein the visual representation of support for function block instantiation comprises a first count of total instantiable function blocks supported by the field device; and
enabling, via the processor of the computer, a visual instantiation facility configured for a user to instantiate the function block in the field device if the field device supports function block instantiation.

13. The method of claim 12, wherein the function block comprises a Fieldbus Foundation function block, a Profibus function block, a HART function block, or a combination thereof.

14. The method of claim 12, wherein the DD file comprises instructions written in an International Electrotechnical Commission (IEC) 61804 language standard.

15. The method of claim 12, wherein enabling the visual instantiation facility for the user to instantiate the function block in the field device comprises providing a facility to upload function block instructions into a memory of the field device.

16. The method of claim 12, wherein the visual representation of support for function block instantiation comprises second count of function blocks currently instantiated in the field device and comprising disabling, via the processor of the computer, the visual instantiation facility for the user to instantiate the function block in the field device based on the second count being equal to the first count.

17. The method of claim 12, comprising providing a visual uninstantiation facility to uninstantiate an instantiated function block from the field device.

18. A non-transitory tangible computer-readable medium comprising executable code, the code comprising instructions for:
reading a device description (DD) file;
determining support for function block instantiation in a field device based on the DD file;
displaying a visual representation of support for function block instantiation in the field device wherein the visual representation of support for function block instantiation comprises a first count of total instantiable function blocks supported by the field device; and
providing a visual instantiation facility for a user to instantiate the function block in the field device.

19. The non-transitory tangible computer-readable medium of claim 18, wherein the visual instantiation facility comprises a screen view, a dialog box, or combination thereof, having the visual representation of the function block and configured to receive instructions of the function block for uploading the instructions into a memory of the field device.

20. The non-transitory tangible computer-readable medium of claim 18, wherein the code comprises instructions for providing a visual uninstantiation facility for the user to uninstantiate an instantiated function block from the field device.

21. The non-transitory tangible computer-readable medium of claim 20, wherein providing the visual uninstantiation facility for the user to uninstantiate the instantiated function block from the field device comprises providing a facility to remove computer instructions of the instantiated function block from a memory of the field device.

* * * * *